(12) United States Patent
Uyeki et al.

(10) Patent No.: US 12,485,724 B2
(45) Date of Patent: Dec. 2, 2025

(54) SYSTEM AND METHOD FOR TEMPERATURE CONTROL WHILE CHARGING AN ELECTRIC TRANSPORT DEVICE INSIDE A VEHICLE

(71) Applicant: Honda Motor Co., Ltd., Tokyo (JP)

(72) Inventors: Robert M. Uyeki, Torrance, CA (US); Matthew B. Staal, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 296 days.

(21) Appl. No.: 17/873,418

(22) Filed: Jul. 26, 2022

(65) Prior Publication Data

US 2024/0034121 A1  Feb. 1, 2024

(51) Int. Cl.
*B60H 1/00* (2006.01)
*B60L 53/62* (2019.01)
*B60L 58/10* (2019.01)

(52) U.S. Cl.
CPC .......... *B60H 1/00735* (2013.01); *B60L 53/62* (2019.02); *B60L 58/10* (2019.02); *B60L 2240/34* (2013.01)

(58) Field of Classification Search
CPC ............ B60H 1/00735; B60H 1/00592; B60H 2001/00242; B60H 1/00271; B60H 2001/003; B60L 53/62; B60L 58/10; B60L 2240/34; B60L 1/02; B60L 2200/12; B60L 1/006
See application file for complete search history.

(56) References Cited

U.S. PATENT DOCUMENTS 9,352,635 B1 *  5/2016  Schepmann ....... B60H 1/00392
10,940,804 B2   3/2021  Goetz
(Continued)

FOREIGN PATENT DOCUMENTS

CN   209053477 U    7/2019
DE   19756311 A1    6/1999
(Continued)

OTHER PUBLICATIONS

English Translation for DE-102020106561-A1 (Year: 2020).*

*Primary Examiner* — Faris S Almatrahi
*Assistant Examiner* — Moises Gasca Alva
(74) *Attorney, Agent, or Firm* — Plumsea Law Group, LLC

(57) ABSTRACT

A system and method for regulating temperatures inside of a vehicle while an electric personal transport device is charging inside the vehicle by a heating, ventilation and air conditioning (HVAC) controller including at least one processor is described. In one embodiment, the method includes receiving a signal from at least one of an electric personal transport device presence sensor or a charging unit for an electric personal transport device, the signal indicating that an electric personal transport device is charging inside the vehicle. The method also includes receiving an ambient temperature inside the vehicle from a temperature sensor and comparing the ambient temperature inside the vehicle to a threshold temperature. Based on the comparison of the ambient temperature to the threshold temperature, the method further includes operating at least one heating and cooling system of the vehicle to regulate the temperature inside the vehicle within a temperature range.

18 Claims, 11 Drawing Sheets

(56) References Cited

U.S. PATENT DOCUMENTS

| | | | | |
|---|---|---|---|---|
| 11,634,062 B1* | 4/2023 | Roy | ................... | B60H 1/00742 |
| | | | | 296/24.41 |
| 2013/0122796 A1* | 5/2013 | Lim | ................... | B60H 1/00278 |
| | | | | 454/75 |
| 2014/0121866 A1* | 5/2014 | Dangler | ................. | B60L 53/11 |
| | | | | 701/22 |
| 2014/0125277 A1* | 5/2014 | Van Wiemeersch | ......................... | |
| | | | | H01M 10/486 |
| | | | | 320/108 |
| 2014/0293538 A1* | 10/2014 | Han | ................... | H05K 7/20145 |
| | | | | 361/690 |
| 2018/0126892 A1* | 5/2018 | Souschek | ............. | B62K 15/006 |
| 2018/0212453 A1* | 7/2018 | Kwon | ................ | H01F 27/2876 |
| 2018/0370386 A1* | 12/2018 | Lery | ..................... | B60M 7/003 |
| 2019/0329692 A1* | 10/2019 | Gaither | ................. | A61G 5/128 |
| 2020/0047675 A1* | 2/2020 | Ellis | ....................... | B60R 5/041 |
| 2021/0061124 A1* | 3/2021 | Kim | ........................ | B60L 53/80 |
| 2021/0251109 A1* | 8/2021 | Wippler | .................... | H02J 7/02 |
| 2022/0016958 A1* | 1/2022 | Komazawa | .......... | B60H 1/3205 |

FOREIGN PATENT DOCUMENTS

| | | | | |
|---|---|---|---|---|
| DE | 102012004821 A1 | | 9/2013 | |
| DE | 102013003567 A1 | | 9/2013 | |
| DE | 102013020180 A1 | | 4/2015 | |
| DE | 102014226461 A1 | | 6/2016 | |
| DE | 202019005022 U1 | | 3/2020 | |
| DE | 102018128448 A1 | | 5/2020 | |
| DE | 102019131095 A1 | | 5/2021 | |
| DE | 102020106561 A1 * | | 9/2021 | ............ B60N 3/042 |
| DE | 102020112229 A1 | | 11/2021 | |
| EP | 3305580 A1 | | 4/2018 | |
| WO | 2009096583 A1 | | 8/2009 | |
| WO | 2013072306 A1 | | 5/2013 | |
| WO | 2015099311 A1 | | 7/2015 | |

* cited by examiner

SYSTEM AND METHOD FOR TEMPERATURE CONTROL WHILE CHARGING AN ELECTRIC TRANSPORT DEVICE INSIDE A VEHICLE

BACKGROUND

This disclosure relates generally to vehicles, and in particular to a system and method for controlling the temperature while charging an electric transport device inside a vehicle.

With rising prices of gasoline and automobiles, many people may turn to other more cost efficient modes of transportation such as, for example, mopeds, bicycles, scooters and, more recently, electric personal transport devices, such as electric scooters. These electric transport devices may be particularly popular for shorter trips in a city environment due to their compact size, ease of use, mobility, and the fact that they may be folded as needed for ease of portability. They may also be useful for covering the first mile or last mile of a trip which is the link between a user's origin or destination and another transportation means, hub or mass transit network.

Preferably, an electric personal transport device will be charged and ready for use when needed. Efficiently charging a battery of an electric personal transport device, however, may be affected by temperature fluctuations. These temperature fluctuations may reduce the effectiveness or rate of charging of the battery of the electric personal transport device, thereby potentially preventing it from being ready to use.

Accordingly, there is a need in the art for an improved system and method for regulating temperatures while charging an electric transport device inside a vehicle.

SUMMARY

In one aspect, a method of regulating temperatures inside of a vehicle while an electric personal transport device is charging inside the vehicle by a heating, ventilation and air conditioning (HVAC) controller including at least one processor is provided. The method includes receiving a signal from at least one of an electric personal transport device presence sensor or a charging unit for an electric personal transport device, the signal indicating that an electric personal transport device is charging inside the vehicle. The method also includes receiving an ambient temperature inside the vehicle from at least one temperature sensor and comparing the ambient temperature inside the vehicle to a threshold temperature. Based on the comparison of the ambient temperature inside the vehicle to the threshold temperature, the method further includes operating at least one heating and cooling system of the vehicle to regulate the temperature inside the vehicle within a temperature range.

In another aspect, a charging temperature control system for a vehicle is provided. The charging temperature control system includes a heating, ventilation and air conditioning (HVAC) controller including at least one processor and at least one heating and cooling system configured to be controlled by the HVAC controller. The system also includes at least one temperature sensor for measuring an ambient temperature inside the vehicle, an electric personal transport device presence sensor, and a charging unit for an electric personal transport device. The at least one processor of the HVAC controller is configured to receive a signal from at least one of the electric personal transport device presence sensor or the charging unit, the signal indicating that an electric personal transport device is charging inside the vehicle, receive an ambient temperature inside the vehicle from the at least one temperature sensor, and compare the ambient temperature inside the vehicle to a threshold temperature. Based on the comparison of the ambient temperature inside the vehicle to the threshold temperature, at least one processor of the HVAC controller is further configured to operate the at least one heating and cooling system to regulate the temperature inside the vehicle within a temperature range.

In another aspect, a method of regulating temperatures inside of an electric vehicle while an electric personal transport device is charging inside the electric vehicle by a heating, ventilation and air conditioning (HVAC) controller including at least one processor is provided. The method includes detecting whether a battery of the electric vehicle is currently being charged and receiving a signal from at least one of an electric personal transport device presence sensor or a charging unit for an electric personal transport device, the signal indicating that an electric personal transport device is charging inside the electric vehicle. The method also includes receiving an ambient temperature inside the vehicle from at least one temperature sensor and comparing the ambient temperature inside the electric vehicle to a threshold temperature. Based on the comparison of the ambient temperature inside the electric vehicle to the threshold temperature, the method further includes operating at least one heating and cooling system of the vehicle to regulate the temperature inside the electric vehicle within a temperature range. The threshold temperature varies based on whether the battery of the electric vehicle is being charged or not.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Methods and systems for controlling the temperature while charging an electric personal transport device inside a vehicle are described herein. The techniques of the present embodiments may be used to regulate the temperature inside a vehicle within an acceptable or optimum range to allow a battery of an electric personal transport device to be charged inside the vehicle without negatively affecting the charging rate or effectiveness caused by high or low temperatures.

The example embodiments are described herein with reference to an electric personal transport device in the form of an electric scooter. As used herein, an electric scooter is a term used mainly to describe a scooter that is electrically powered. For example, this is a type of personal transport device that is gaining ridership in many locations. The principles of the example embodiments described herein may be applied to electric scooters or other types of electric personal transport devices, such as bicycles, unicycles, mopeds, skateboards, kickboards, wheelchairs, personal transporters, or the like. In an example embodiment, the electric personal transport devices are configured to fit inside another vehicle, such as an automobile, including cars, trucks, vans, wagons, and similar forms of motor vehicles powered by any type of power source.

In the example embodiments described herein, the electric scooter has an outer casing having a generally rectangular shape, including two flat sides having a length that is longer than a width. In addition, the electric scooter of the present embodiments has a thickness that is substantially smaller than the length and/or width of the electric scooter. In the example embodiments, the electric scooter may be transitioned from a stowed configuration in which components of the electric scooter are stored or disposed inside the rectangular outer casing to a riding configuration in which components of the electric scooter are folded or opened from their stored positions to extended positions outside of the outer casing so that the electric scooter may be operated or ridden by a user.

The present embodiments allow for one or more electric scooters to be placed inside the vehicle in the stowed configuration for easy storage and/or transportation, while also allowing batteries of the one or more of the electric scooters to be charged inside the vehicle in a temperature-controlled environment to provide effective or optimum conditions for charging.

Figure 1:
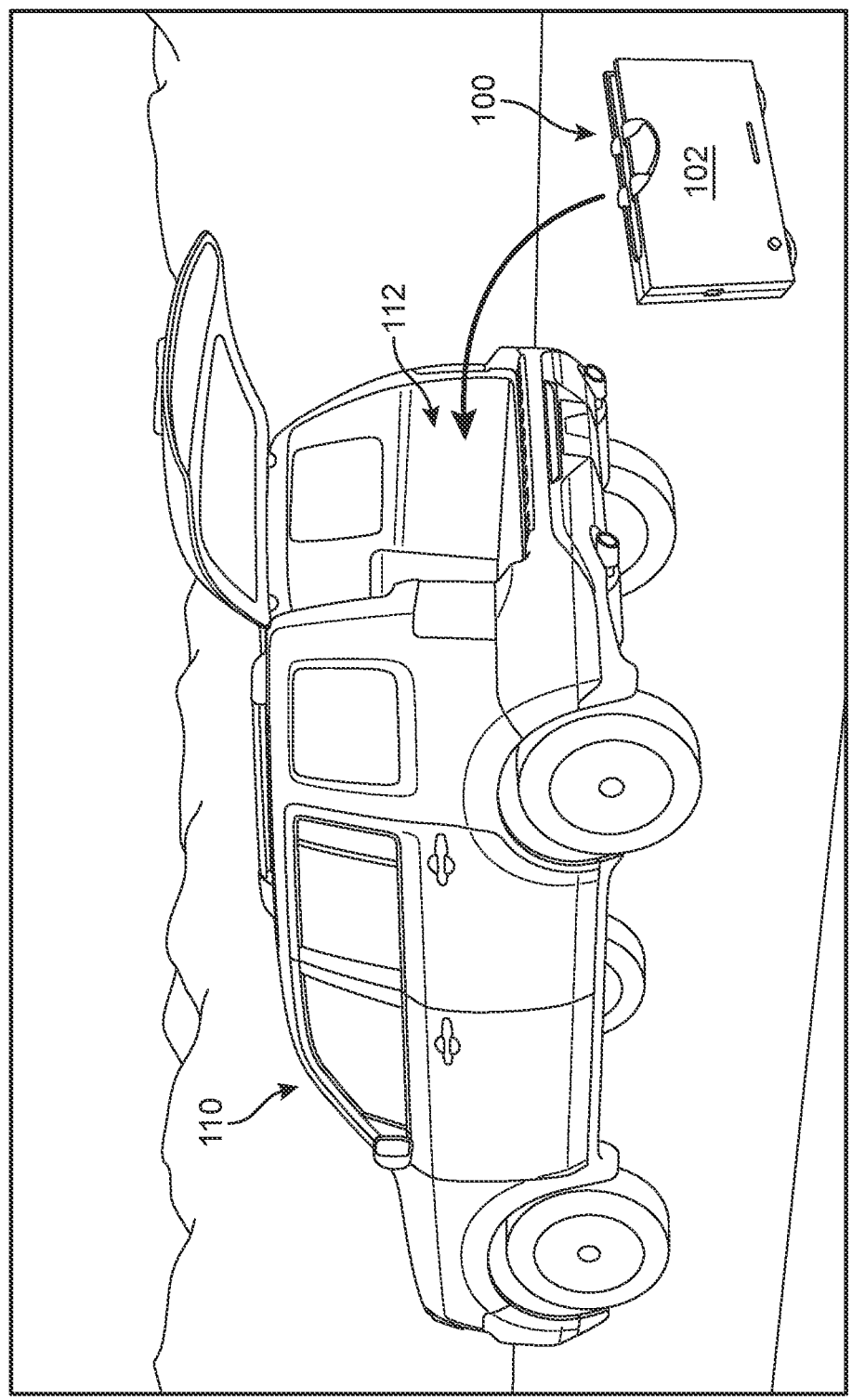
FIG. 1 is a representative view of an example embodiment of an electric transport device in the form of an electric scooter being placed into a vehicle for charging in accordance with aspects of the present disclosure.
Figure 2:
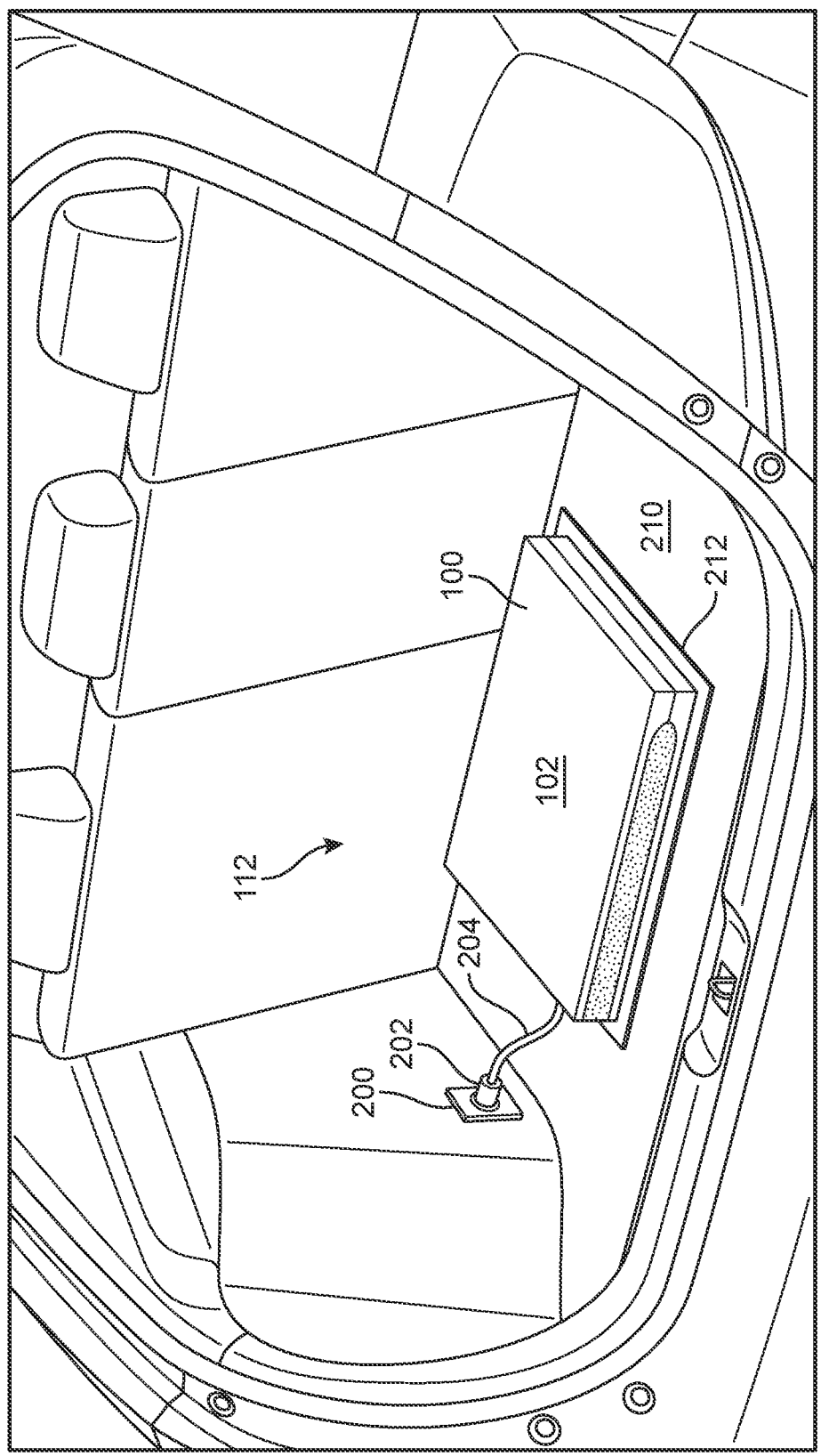
FIG. 2 is a representative view of the example embodiment of the electric scooter charging inside the vehicle in accordance with aspects of the present disclosure.

Referring now to FIGS. 1 and 2, an example embodiment of an electric scooter 100 is shown. In some embodiments, electric scooter 100 may be transitioned between a stowed configuration in which components of electric scooter 100 are stored or disposed inside an outer casing 102 to a riding configuration in which components of electric scooter 100 are folded or opened from their stored positions to extended positions outside of outer casing 102 so that electric scooter 100 may be operated or ridden by a user. As shown in FIG. 1, electric scooter 100 is in the stowed configuration.

In this embodiment, electric scooter 100 has an approximately rectangular shape defined by outer casing 102 having a length that is longer than a width. Outer casing 102 includes a first side surface and an opposite second side surface. In an example embodiment, side surfaces of outer casing 102 are substantially flat, including each of the first side surface and the second side surface. Outer casing 102 of electric scooter 100 extends between a front edge and an opposite rear edge, as well as a top edge and an opposite bottom edge. The front edge, rear edge, top edge, and bottom edge are substantially straight and define an outer perimeter of the rectangular-shaped outer housing 102 of electric scooter 100.

As shown in FIG. 1, electric scooter 100 is configured to fit inside a vehicle 110. In an example embodiment, electric scooter 100 may be placed into a rear compartment 112 of vehicle 110. In this embodiment, vehicle 110 is in the form of a sport utility vehicle (SUV) or similar vehicle having rear compartment 112 in the form of a cargo area or similar space. In other embodiments, electric scooter 100 may be placed into one or more different compartments of a vehicle, including vehicles of different types. For example, in some embodiments, electric scooter 100 may be placed into a compartment at the front of a vehicle, such as a front trunk or frunk, a passenger compartment of the vehicle, such as the cabin where the driver and/or passengers may sit, and/or a compartment at the rear of the vehicle, such as a rear trunk, hatch, bed, or cargo area.

Referring now to FIG. 2, a close up view of rear compartment 112 of vehicle 110 is shown with electric scooter 100 disposed inside vehicle 110. In an example embodiment, a power outlet 200 is provided inside vehicle 110 to allow charging of electric scooter 100. Power outlet 200 may be a conventional 12 volt direct current (DC) accessory outlet typically found in automobiles to provide power to various devices. In other embodiments, power outlet 200 may be a different type of outlet that is configured to provide different amounts and/or types of electric power. For example, in some cases, power outlet 200 may be adapted to provide 110 volt alternating current (AC), such as is commonly used by devices and appliances in commercial and residential buildings. In these cases, power outlet 200 may include additional components, such as inverters or similar, to adapt the 12V DC power to 110V AC power. In still other embodiments, power outlet 200 may be electrically connected to a battery of vehicle 110 used for providing motive power to an electric motor (e.g., in the case of a battery electric vehicle (BEV) or plug-in electric vehicle (PEV)) and may include components to allow electric scooter 100 to be charged therefrom.

In this embodiment, power outlet 200 is located at the rear of vehicle 110 and is accessible from rear compartment 112 so that electric scooter 100 may be charged while being stored or carried inside rear compartment 112 of vehicle 110. In other embodiments, power outlet 200, as well as additional power outlets substantially similar to power outlet 200, may be located near other compartments of a vehicle (e.g., vehicle 110) where electric scooter 100 may be stored so that power outlet 200 is accessible to charge electric scooter 100 from inside the vehicle.

In some embodiments, a plug 202 at one end of a power cord 204 may permit electric scooter 100 to be electrically connected to power outlet 200 via a physical connection. For example, an opposite end of power cord 204 may be connected to a port or similar opening in electric scooter 100 that is electrically connected to a battery (e.g., battery 312 shown in FIG. 3) disposed inside of electric scooter 100. With this arrangement, power outlet 200 may provide electric power to the battery of electric scooter 100 to charge the battery so that the battery may power an electric motor of electric scooter 100 when electric scooter 100 is ridden by a user.

In this embodiment, power outlet 200 is physically connected to electric scooter 100 via plug 202 and power cord 204. In other embodiments, power outlet 200 may be electrically connected to a charger that is connected to electric scooter 100 to charge the battery of electric scooter 100. In still other embodiments, power may be provided from an electrical system of vehicle 110 to electric scooter 100 using known wireless technology, such as by induction charging.

In an example embodiment, electric scooter 100 may be configured to lay flat on a floor surface 210 of rear compartment 112 of vehicle 110. Allowing electric scooter 100 to be stored inside vehicle 110 on a flat surface may assist with keeping electric scooter 100 in a stable position, as well as permitting stacking of additional electric scooters on top of electric scooter 100. In some embodiments, a tray 212 may be provided on floor surface 210 of rear compartment 112 of vehicle 110. Tray 212 may be dimensioned and sized so as to hold electric scooter 110 in place on floor surface 210 and restrain or prevent movement of electric scooter 100 while vehicle 110 is in motion. In other embodiments, tray 212 may incorporate a charger for charging the battery of electric scooter 100 and may be electrically connected to power outlet 200. In still other embodiments, for example, where electric scooter 100 may be charged using wireless technology, such as induction charging, tray 212 may include an induction charger and may be configured to align a battery of electric scooter 100 with the induction charger so that the battery may be charged while electric scooter 100 is placed on tray 212.

In some embodiments, a heating, ventilation and air conditioning (HVAC) system of a vehicle may be used to regulate temperatures inside the vehicle while the electric scooter is charging to maintain effective or optimum conditions for charging. That is, excessively hot or cold temperatures can negatively affect the ability of a battery to effectively charge and/or can reduce the charging rate (e.g., the amount of time it takes to charge the battery to a desired charge capacity). By regulating the temperatures inside the vehicle within a temperature range in accordance with the techniques of the present embodiments while the electric scooter is charging, effective or optimum conditions for charging may be provided.

Figure 3:
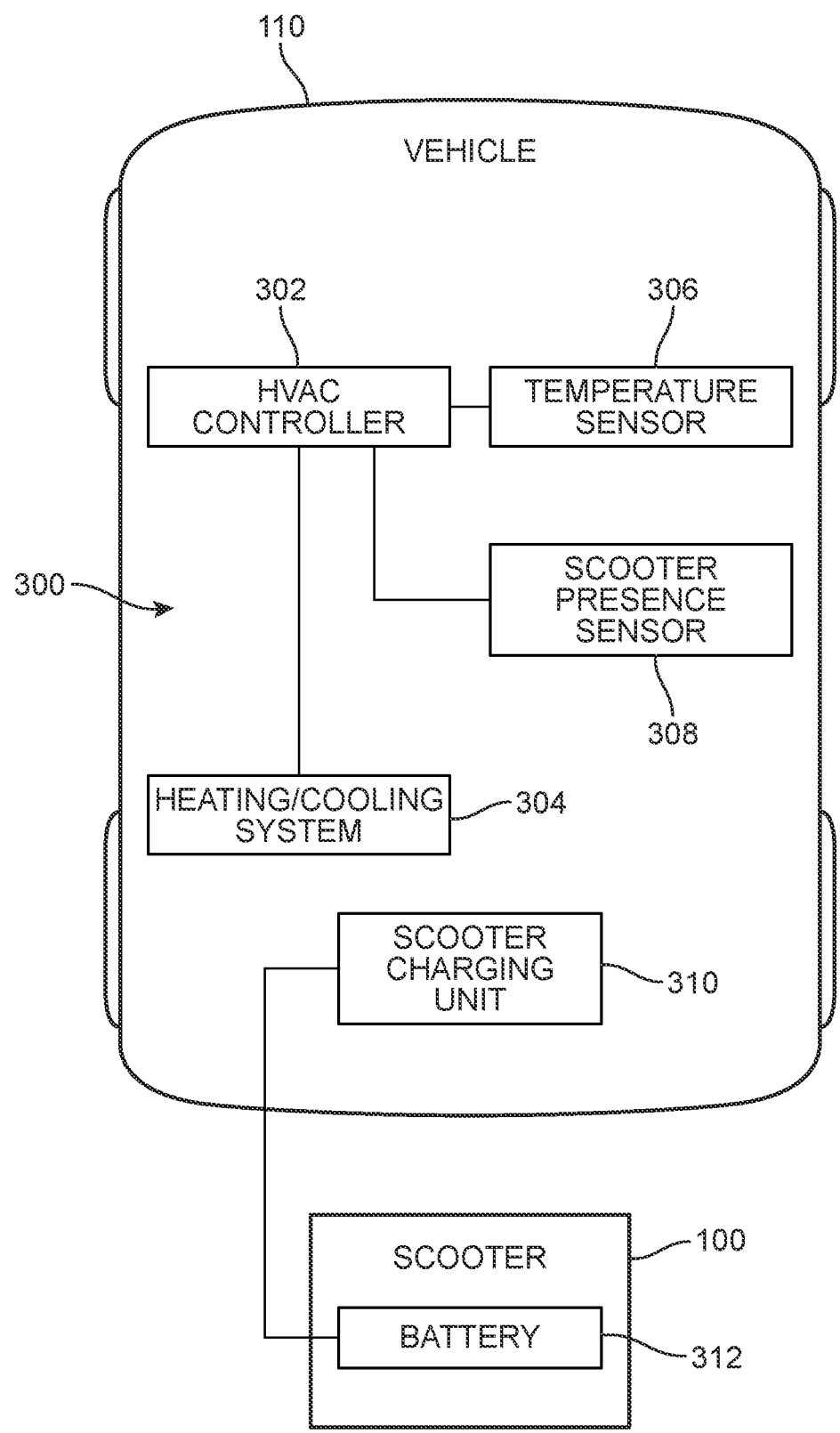
FIG. 3 is a schematic block diagram of an example embodiment of a charging temperature control system of a vehicle for use while charging the electric scooter in accordance with aspects of the present disclosure.

Referring now to FIG. 3, a schematic block diagram of an example embodiment of a charging temperature control system 300 of a vehicle for regulating temperatures while charging an electric personal transport device inside the vehicle is shown. In an example embodiment, charging temperature control system 300 may be associated with vehicle 110 and may be used to regulate the temperatures inside vehicle 110, including rear compartment 112, while an electric personal transport device in the form of electric scooter 100 is being charged inside vehicle 110. In some embodiments, vehicle 110 includes an HVAC system configured to provide cooling and/or heating capabilities within the interior of vehicle 110, for example, heating and/or cooling system 304 shown in FIG. 3. In an example embodiment, charging temperature control system 300 includes an HVAC controller 302 that is configured to control operation of heating and/or cooling system 304 so as to heat and/or cool the interior of vehicle 110, including one or more compartments, such as rear compartment 112.

In some embodiments, charging temperature control system 300 may also include at least one temperature sensor 306. Temperature sensor 306 is configured to measure or detect ambient temperatures within the interior of vehicle 110. As shown in this embodiment, temperature sensor 306 may provide measured or detected temperatures associated with the interior of vehicle 110 to HVAC controller 302. In some cases, more than one temperature sensor substantially similar to temperature sensor 306 may be located inside of vehicle 110, for example, associated with one or more different compartments of vehicle 110, such as rear compartment 112, as well as other compartments including but not limited to front or rear trunks, a passenger compartment, cargo area, or hatch area. Additionally, in other embodiments, vehicle 110 may further include one or more temperature sensors configured to measure or detect temperatures outside of vehicle 110.

In an example embodiment, charging temperature control system 300 may further include at least one type of a scooter presence sensor 308. Scooter presence sensor 308 is configured to detect or sense that at least one electric personal transport device, for example, electric scooter 100, is present within the interior of vehicle 110. In different embodiments, presence sensor 308 may take various forms, including but not limited to a switch, a weight sensor, a camera, an occupancy sensor, or wireless communication technology, such as WiFi, Bluetooth, or other wireless technologies that may communicate with compatible wireless technologies associated with vehicle 110. In other embodiments, presence sensor 308 may be configured to detect the presence of electric scooter 100 based on receiving a signal from a scooter charging unit 310, for example, power outlet 200, that indicates that a device (e.g., electric scooter 100) is being charged inside vehicle 110. With this arrangement, presence sensor 308 is configured to use one or more of these mechanisms, or other similar mechanisms, to directly or indirectly detect that at least one electric personal transport device, for example, electric scooter 100, is present within the interior of vehicle 110.

In some embodiments, charging temperature control system 300 includes at least one type or form of scooter charging unit 310 that is configured to supply electric power from vehicle 110 to battery 312 of electric scooter 100. For example, in one embodiment, charging unit 310 may be in the form of power outlet 200, described above. In other embodiments, charging unit 310 may be a wired or wireless charger, such as an induction charger. In still other embodiments, charging unit 310 may be incorporated into tray 212, as described above. In an example embodiment, charging unit 310 may provide a signal or message to HVAC controller 302 to indicate that at least one electric personal transport device, for example, electric scooter 100, is connected to charging unit 310 and is being charged. Additionally, as described above, in some cases, this signal from charging unit 310 may also be used to detect or indicate that electric scooter 100 is present within the interior of vehicle 110.

In accordance with the techniques of the present embodiments, HVAC controller 302 is configured to receive information from temperature sensor 306, presence sensor 308, and/or charging unit 310 and automatically regulate the temperature inside of vehicle 110 while electric scooter 100 is being charged to maintain an effective or optimal temperature range inside vehicle 110 for charging battery 312 of electric scooter 100. With this arrangement, the effective or optimal temperature range limits the temperatures inside the vehicle from being too cold (e.g., below a minimum threshold temperature) or being too hot (e.g., above a maximum threshold temperature).

Figure 4:
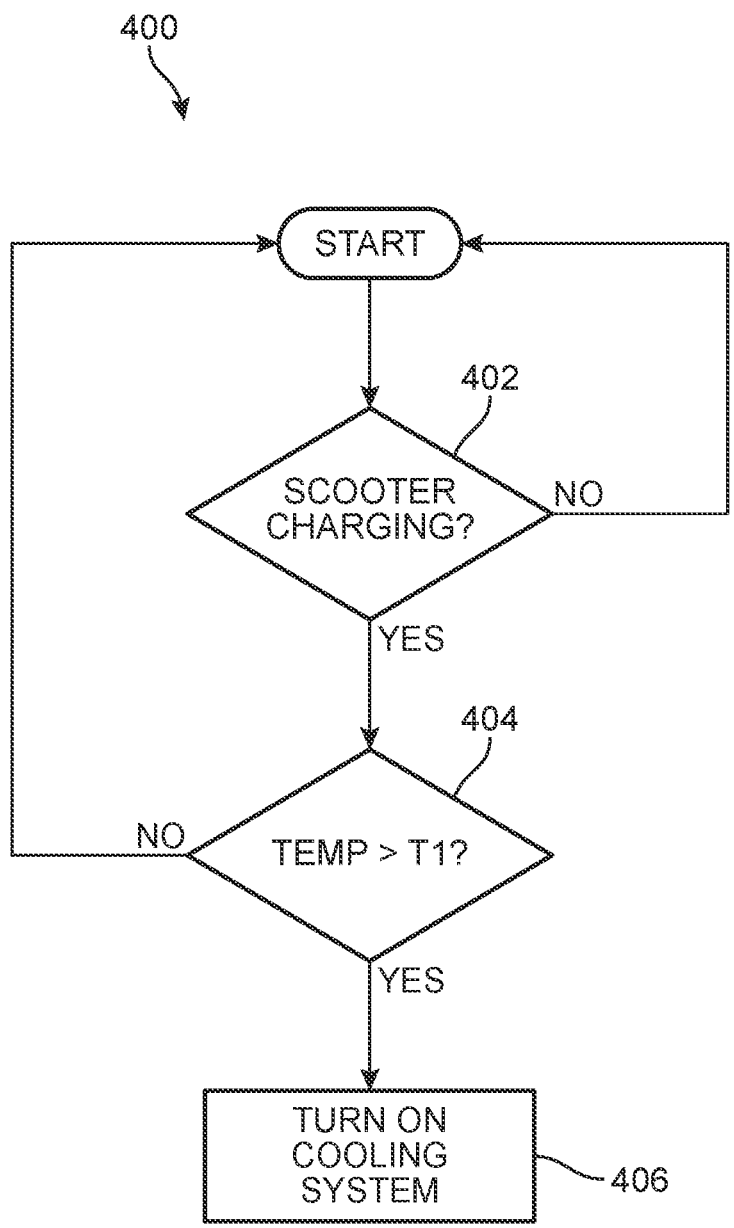
FIG. 4 is a flowchart of an example embodiment of a method for controlling temperature inside a vehicle during charging of the electric scooter in accordance with aspects of the present disclosure.

Referring now to FIG. 4, an example embodiment of a method 400 for controlling temperature inside a vehicle during charging of an electric personal transport device using a cooling system is shown. In an example embodiment, method 400 may be implemented by at least one processor associated with charging temperature control system 300. For example, in some embodiments, a processor of HVAC controller 302 of charging temperature control system 300 may implement method 400. In this embodiment, method 400 is configured to allow charging temperature control system 300 to control an HVAC system of a vehicle, for example, heating and cooling system 304 of vehicle 110, described above, to reduce temperatures inside of vehicle 110, such as by operating the cooling system (e.g., a fan or an air conditioner).

In one embodiment, method 400 may begin at an operation 402. At operation 402, whether or not an electric personal transport device, for example, electric scooter 100, is charging inside the vehicle is detected. For example, at operation 402, a signal from presence sensor 308 and/or a signal from charging unit 310 may be used to make the determination of whether or not electric scooter 100 is charging inside vehicle 110. In some cases, a signal from either presence sensor 308 or charging unit 310 may be used to affirmatively detect that electric scooter 100 is charging inside vehicle 110 (i.e., "Yes" result at operation 402). In other cases, a signal from both presence sensor 308 and charging unit 310 may be needed to affirmatively detect that electric scooter 100 is charging inside vehicle 110 (i.e., "Yes" result at operation 402).

Upon determining at operation 402 that electric scooter 100 is not charging inside vehicle 110 (i.e., "No" result at operation 402), then method 400 may proceed back to the start until such time that presence sensor 308 and/or charging unit 310 detect that electric scooter 100 is charging inside vehicle 110.

Upon determining at operation 402 that electric scooter 100 is charging inside vehicle 110 (i.e., "Yes" result at operation 402), then method 400 may proceed to an operation 404. At operation 404, an ambient temperature inside the vehicle is compared with a first threshold temperature (T1) to determine whether the ambient temperature is greater than the first threshold temperature (T1). For example, the ambient temperature inside vehicle 110 may be provided to HVAC controller 302 of charging temperature control system 300 from temperature sensor 306, described above. In some embodiments, the first threshold temperature (T1) may be a predetermined temperature associated with degraded or inefficient charging of a battery. For example, in some embodiments, the first threshold temperature (T1) may be approximately 140 degrees Fahrenheit or 60 degrees Celsius. In another embodiment, the first threshold temperature (T1) may be approximately 100 degrees Fahrenheit or 40 degrees Celsius. In other embodiments, the first threshold temperature (T1) may be a higher temperature or a lower temperature.

Upon determining at operation 404 that the ambient temperature inside the vehicle is not greater than the first threshold temperature (T1) (i.e., "No" result at operation 404), then method 400 may proceed back to the start. Method 400 may be restarted after expiration of a predetermined time (e.g., 30 minutes, one hour, etc.), until such time that presence sensor 308 and/or charging unit 310 newly detect that electric scooter 100 is charging inside vehicle 110, or until an ambient temperature in excess of the first threshold temperature (T1) is measured or detected by temperature sensor 306.

Upon determining at operation 404 that the ambient temperature inside the vehicle is greater than the first threshold temperature (T1) (i.e., "Yes" result at operation 404), then method 400 may proceed to an operation 406. At operation 406, a cooling system of the vehicle is operated to turn on to reduce the temperature inside of the vehicle. For example, at operation 406, HVAC controller 302 of charging temperature control system 300 may operate the cooling system (e.g., a fan or air conditioner) of heating and cooling system 304 of vehicle 110 to reduce the ambient temperature inside of vehicle 110 while electric scooter 100 is charging. In some cases, the cooling system may remain on while electric scooter 100 is charging. In other cases, the cooling system may be turned off when the ambient temperature measured or detected by temperature sensor 306 is less than the first threshold temperature (T1). In still other cases, the cooling system may be controlled to remain on for a predetermined amount of time, or to maintain the ambient temperature at a consistent temperature below the first threshold temperature (T1).

Figure 5A:
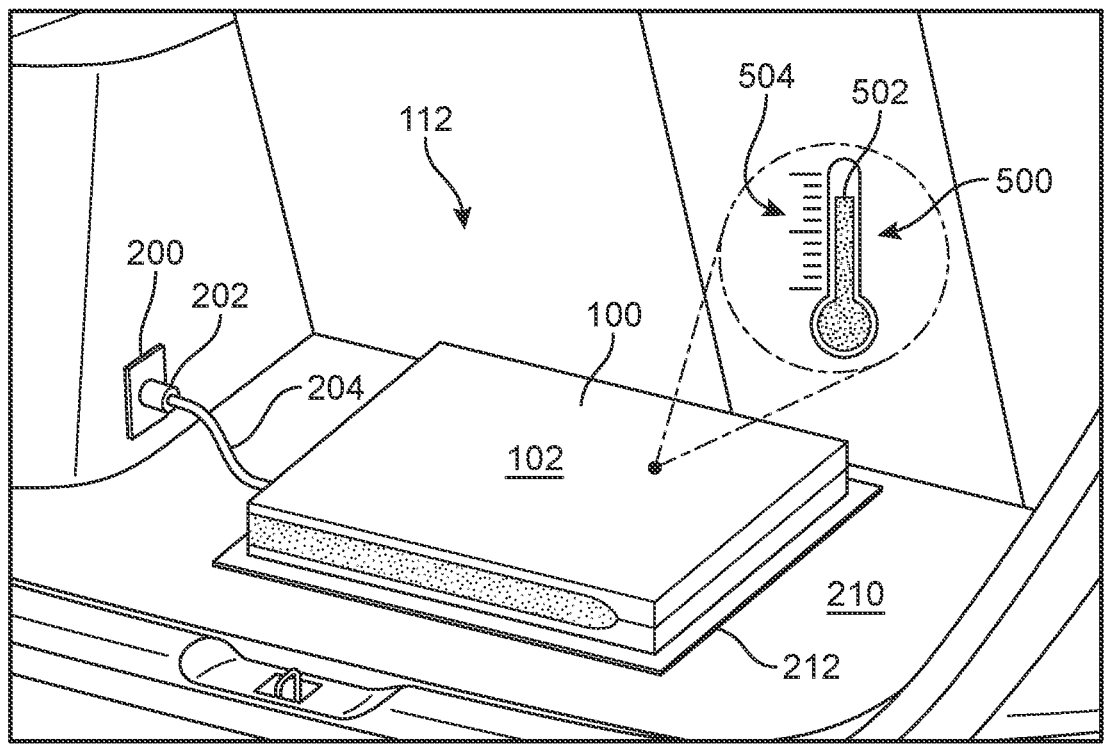
FIG. 5A is a representative view of an example scenario of charging an electric scooter inside of a vehicle in accordance with aspects of the present disclosure.
Figure 5B:
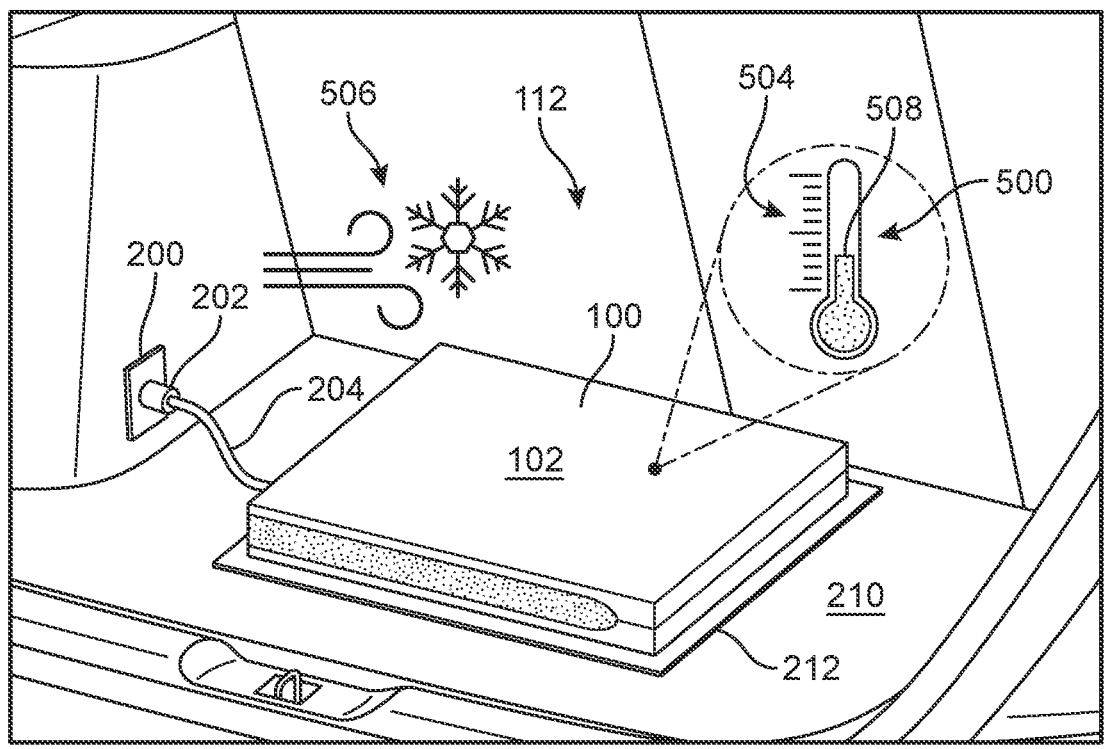
FIG. 5B is a representative view of an example scenario of controlling the temperature inside the vehicle while the electric scooter is charging in accordance with aspects of the present disclosure.

FIGS. 5A and 5B illustrate an example scenario in which the techniques of the present embodiments for controlling the temperature while charging an electric personal transport device inside a vehicle may be used. Referring first to FIG. 5A, electric scooter 100 is shown charging via power outlet 200 connected by plug 202 and power cord 204 inside of rear compartment 112 of vehicle 110. In this example scenario, an ambient temperature 500 inside vehicle 110, for example, as measured or detected by temperature sensor 306, is at a first temperature 502 that exceeds a first threshold temperature (T1) 504. For example, in an example embodiment, first threshold temperature (T1) 504 may be 140 degrees and first temperature 502 is greater than 140 degrees.

In accordance with the techniques described herein, upon detection of electric scooter 100 charging inside vehicle 110 and detection of ambient temperature 500 inside vehicle 110 being first temperature 502 greater than first threshold temperature (T1) 504 (as shown in the example scenario of FIG. 5A), HVAC controller 302 of charging temperature control system 300 may operate the cooling system of heating and cooling system 304 of vehicle 110 to reduce ambient temperature 500 inside of vehicle 110 while electric scooter 100 is charging.

Referring now to FIG. 5B, HVAC controller 302 of charging temperature control system 300 is shown controlling heating and cooling system 304 to reduce ambient temperature 500 inside vehicle 110 while electric scooter 100 is charging. In this example scenario, HVAC controller 302 operates the cooling system (e.g., a fan or air conditioner) of heating and cooling system 304 of vehicle 110 to reduce ambient temperature 500 inside of vehicle 110 while electric scooter 100 is charging. As shown in FIG. 5B, cool or cold air 506 from the cooling system of heating and cooling system 304 circulates within the interior of vehicle 110 and reduces ambient temperature 500 from first temperature 502 (as shown in FIG. 5A) to a second temperature 508 that is lower than first temperature 502. Second temperature 508 is at least less than first threshold temperature (T1) 504. For example, in an example embodiment, first threshold temperature (T1) 504 may be 140 degrees and second temperature 508 is less than 140 degrees. With this arrangement, charging temperature control system 300 may control the temperature inside vehicle 110 while electric scooter 100 is charging so that battery 312 of electric scooter 100 may be effectively or efficiently charged.

In some embodiments, charging of a battery of an electric personal transport device, for example, electric scooter 100, may also be affected by low temperatures that are below an effective or optimum lower temperature threshold. That is, in extreme cold temperatures, an ability to charge and/or a charging rate may be negatively affected. The principles of the example embodiments described herein may also be used to control a heating system of a vehicle to increase ambient temperatures inside the vehicle while the electric scooter is charging to improve the ability or capacity for charging.

Figure 6:
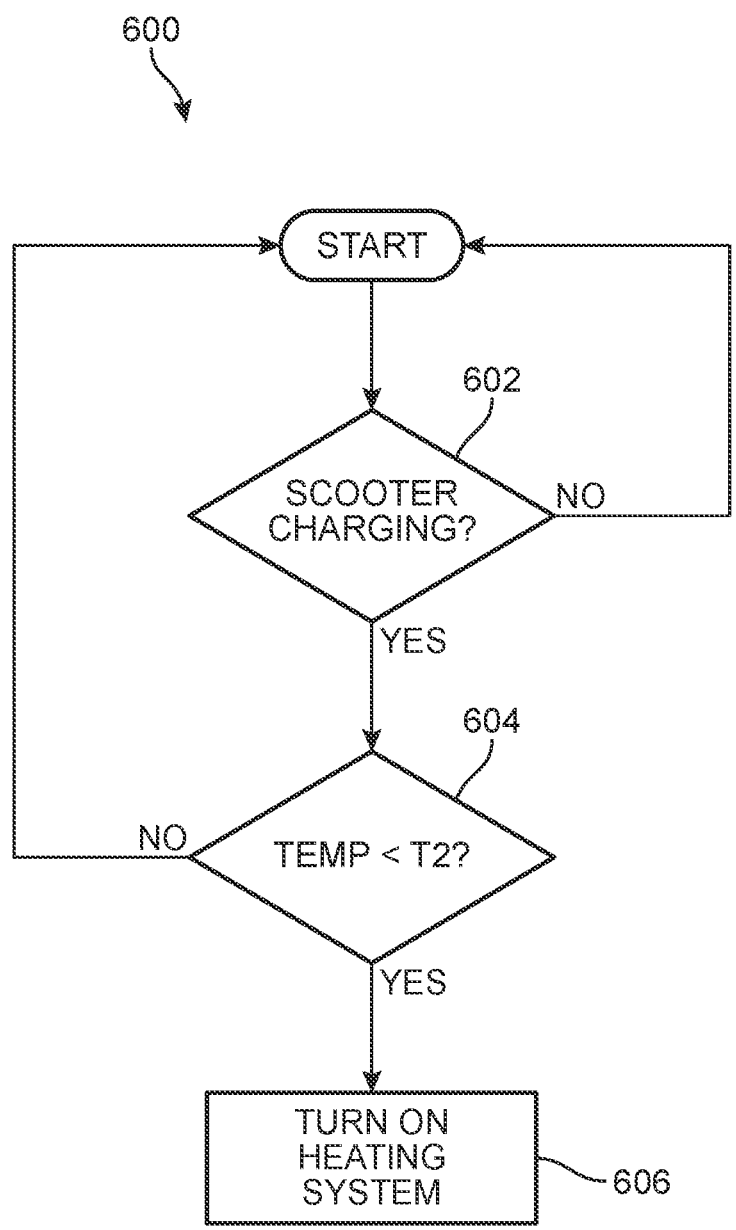
FIG. 6 is another embodiment of a method for controlling temperature inside a vehicle during charging of the electric scooter in accordance with aspects of the present disclosure.

Referring now to FIG. 6, an example embodiment of a method 600 for controlling temperature inside a vehicle during charging of an electric personal transport device using a heating system is shown. In an example embodiment, method 600 may be implemented by at least one processor associated with charging temperature control system 300. For example, in some embodiments, a processor of HVAC controller 302 of charging temperature control system 300 may implement method 600. In this embodiment, method 600 is configured to allow charging temperature control system 300 to control an HVAC system of a vehicle, for example, heating and cooling system 304 of vehicle 110, described above, to increase temperatures inside of vehicle 110, such as by operating the heating system.

In one embodiment, method 600 may begin at an operation 602. At operation 602, whether or not an electric personal transport device, for example, electric scooter 100, is charging inside the vehicle is detected. For example, at operation 602, a signal from presence sensor 308 and/or a signal from charging unit 310 may be used to make the determination of whether or not electric scooter 100 is charging inside vehicle 110. In some cases, a signal from either presence sensor 308 or charging unit 310 may be used to affirmatively detect that electric scooter 100 is charging inside vehicle 110 (i.e., "Yes" result at operation 602). In other cases, a signal from both presence sensor 308 and charging unit 310 may be needed to affirmatively detect that electric scooter 100 is charging inside vehicle 110 (i.e., "Yes" result at operation 602).

Upon determining at operation 602 that electric scooter 100 is not charging inside vehicle 110 (i.e., "No" result at operation 602), then method 600 may proceed back to the start until such time that presence sensor 308 and/or charging unit 310 detect that electric scooter 100 is charging inside vehicle 110.

Upon determining at operation 602 that electric scooter 100 is charging inside vehicle 110 (i.e., "Yes" result at operation 602), then method 600 may proceed to an operation 604. At operation 604, an ambient temperature inside the vehicle is compared with a second threshold temperature (T2) to determine whether the ambient temperature is less than the second threshold temperature (T2). For example, the ambient temperature inside vehicle 110 may be provided to HVAC controller 302 of charging temperature control system 300 from temperature sensor 306, described above. In some embodiments, the second threshold temperature (T2) may be a predetermined temperature associated with degraded or inefficient charging of a battery. For example, in some embodiments, the second threshold temperature (T2) may be approximately 14 degrees Fahrenheit or −10 degrees Celsius. In another embodiment, the second threshold temperature (T2) may be approximately 32 degrees Fahrenheit or 0 degrees Celsius. In other embodiments, the second threshold temperature (T2) may be a higher temperature or a lower temperature.

Upon determining at operation 604 that the ambient temperature inside the vehicle is not less than the second threshold temperature (T2) (i.e., "No" result at operation 604), then method 600 may proceed back to the start. Method 600 may be restarted after expiration of a predetermined time (e.g., 30 minutes, one hour, etc.), until such time that presence sensor 308 and/or charging unit 310 newly detect that electric scooter 100 is charging inside vehicle 110, or until an ambient temperature below the second threshold temperature (T2) is measured or detected by temperature sensor 306.

Upon determining at operation 604 that the ambient temperature inside the vehicle is less than the second threshold temperature (T2) (i.e., "Yes" result at operation 604), then method 600 may proceed to an operation 606. At operation 606, a heating system of the vehicle is operated to turn on to increase the temperature inside of the vehicle. For example, at operation 606, HVAC controller 302 of charging temperature control system 300 may operate the heating system of heating and cooling system 304 of vehicle 110 to increase the ambient temperature inside of vehicle 110 while electric scooter 100 is charging. In some cases, the heating system may remain on while electric scooter 100 is charging. In other cases, the heating system may be turned off when the ambient temperature measured or detected by temperature sensor 306 is greater than the second threshold temperature (T2). In still other cases, the heating system may be controlled to remain on for a predetermined amount of time, or to maintain the ambient temperature at a consistent temperature above the second threshold temperature (T2).

With this arrangement, charging temperature control system 300 of the present embodiments may operate heating and cooling system 304 of vehicle 110 according to either or both of method 400 and method 600 to maintain an efficient or ideal temperature range inside vehicle 110 for optimum charging of electric scooter 100. By regulating temperatures inside the vehicle while the electric personal transport device is charging, the electric personal transport device (e.g., electric scooter 100) may be ready for riding by a user when needed.

In some embodiments, charging temperature control system 300 is configured to implement the techniques described herein using existing HVAC systems found in a vehicle, for example, heating and cooling system 304 of vehicle 110, described above. In another embodiment, a vehicle, such as vehicle 110, may include one or more supplemental or auxiliary HVAC systems with air outlets that are located in various compartments of the vehicle to provide supplemental or auxiliary heating and/or cooling capabilities to these compartments of the vehicle. With this arrangement, the temperature in one of these compartments may be more precisely regulated while an electric personal transport device is charging in the compartment by the supplemental or auxiliary HVAC system.

Figure 7:
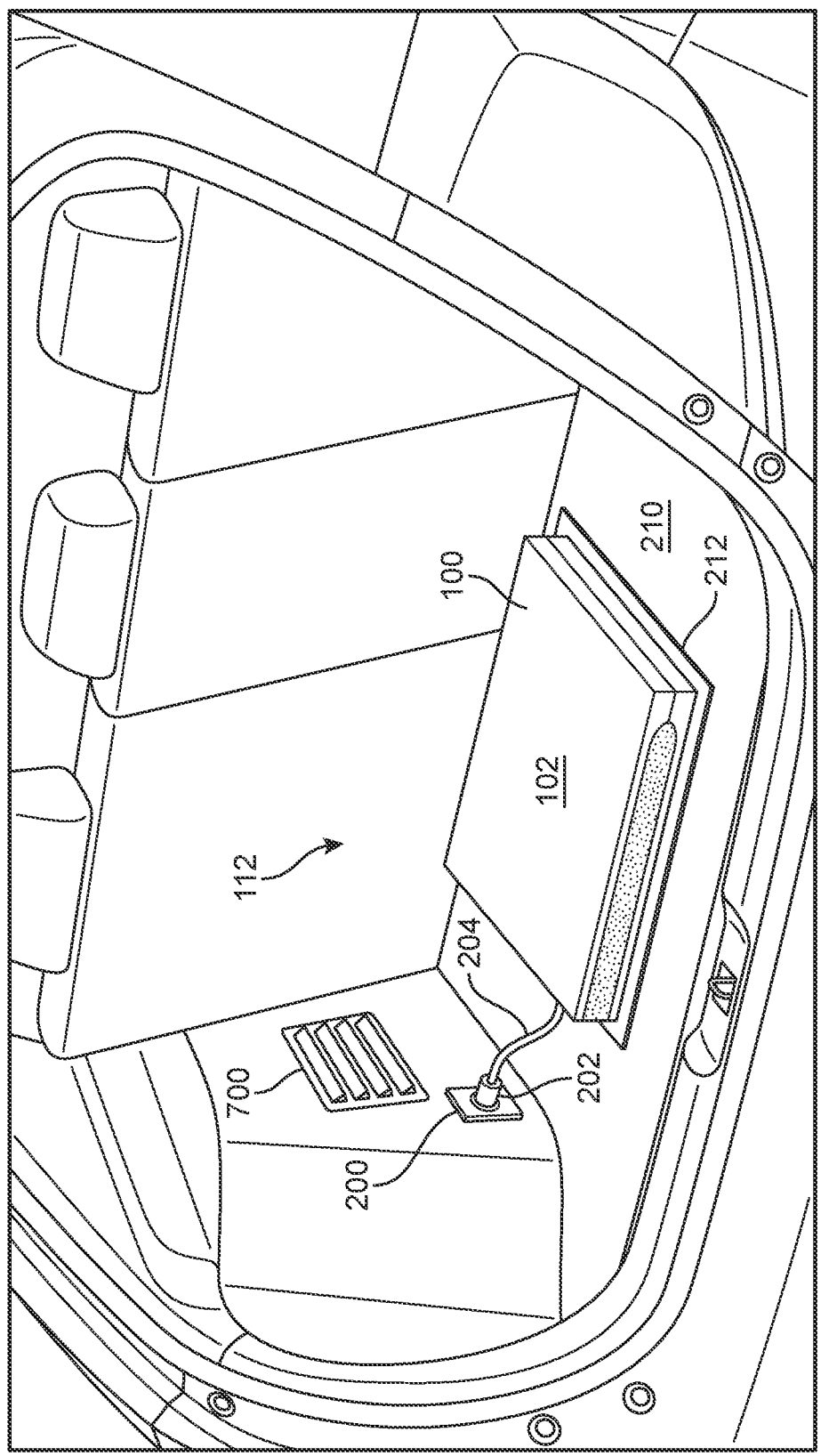
FIG. 7 is representative view of an example embodiment of a supplemental heating and/or cooling system inside of a vehicle to control the temperature of an electric scooter during charging in accordance with aspects of the present disclosure.

Referring now to FIG. 7, an alternate embodiment of a charging temperature control system that uses a supplemental heating and/or cooling system inside of a vehicle to control the temperature of an electric scooter during charging is shown. In this embodiment, an air outlet 700 associated with a supplemental heating and/or cooling system is shown located at rear compartment 112 of vehicle 110. Electric scooter 100 is shown laying flat within tray 212 on floor 210 of rear compartment 112. In this embodiment, power outlet 200 is physically connected to electric scooter 100 via plug 202 and power cord 204 so that electric scooter 100 is charging inside of vehicle 110. In other embodiments, electric scooter 100 may be charging using any of the other charging techniques described above. With this arrangement, air outlet 700 of the supplemental heating and/or cooling system may be used to provide cold air (e.g., from a cooling system) or hot air (e.g., from a heating system) to reduce or increase temperatures inside the compartment of the vehicle (e.g., rear compartment 112 of vehicle 110 in this example).

Figure 8:
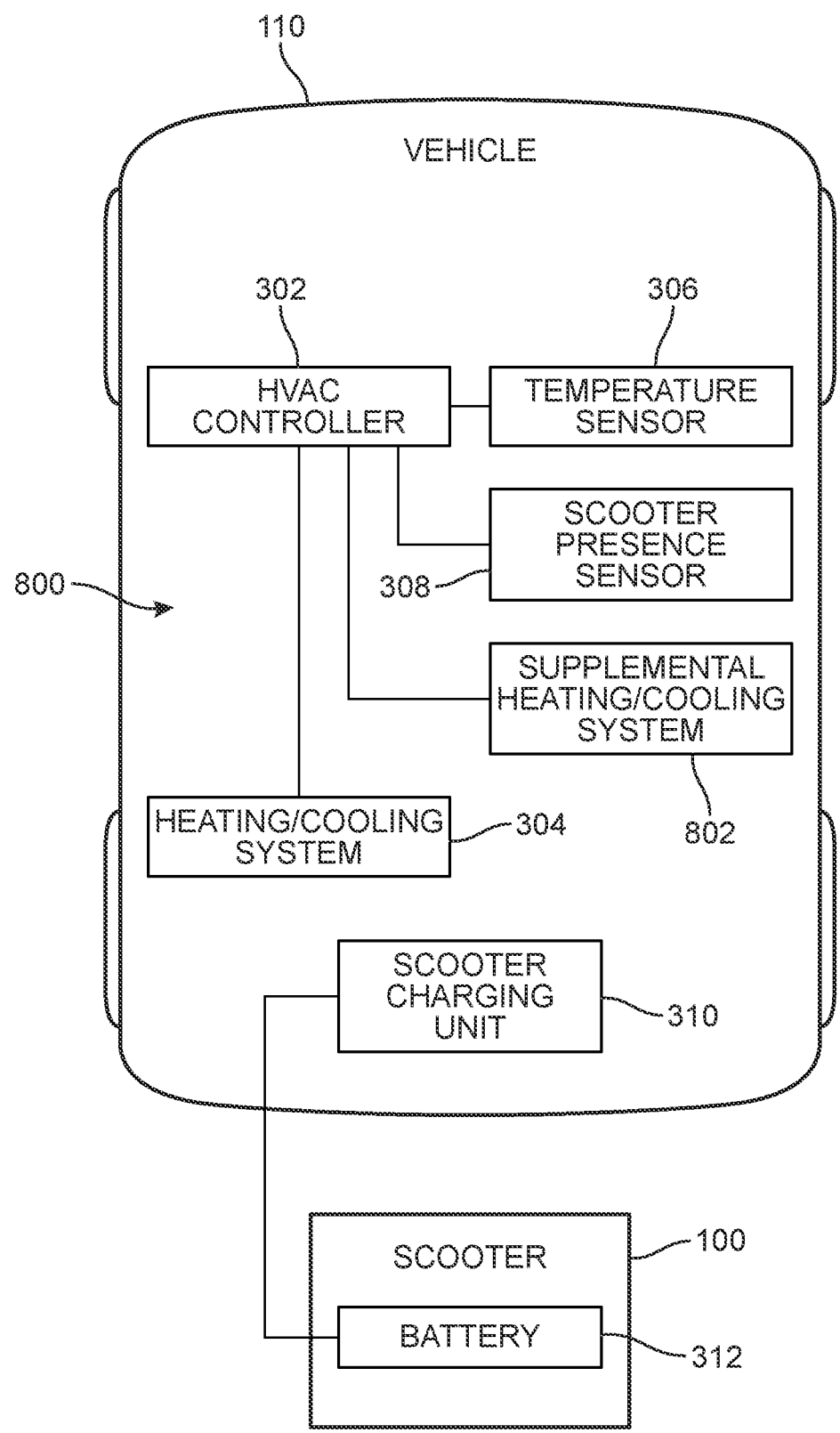
FIG. 8 is a schematic block diagram of another embodiment of a charging temperature control system of a vehicle having a supplemental heating and/or cooling system for use while charging the electric scooter in accordance with aspects of the present disclosure.

Referring now to FIG. 8, a schematic block diagram of an example embodiment of a charging temperature control system 800 of a vehicle for regulating temperatures using a supplemental or auxiliary heating and cooling system while charging an electric personal transport device inside the vehicle is shown. In an example embodiment, charging temperature control system 800 may be associated with vehicle 110 and may be used to regulate the temperatures inside one or more compartments of vehicle 110, including rear compartment 112, while an electric personal transport device in the form of electric scooter 100 is being charged inside vehicle 110.

In some embodiments, charging temperature control system 800 may include substantially similar components as charging temperature control system 300, described above. In this embodiment, vehicle 110 includes a primary HVAC system configured to provide cooling and/or heating capabilities within the interior of vehicle 110, for example, heating and/or cooling system 300. In an example embodiment, charging temperature control system 300 includes HVAC controller 302 that is configured to control operation of heating and/or cooling system 304 so as to heat and/or cool the interior of vehicle 110, including one or more compartments, such as rear compartment 112. Charging temperature control system 800 may also include at least one temperature sensor 306 to measure or detect ambient temperatures within the interior of vehicle 110, as described above. Charging temperature control system 800 may further include at least one type of a scooter presence sensor 308 to detect or sense that at least one electric personal transport device, for example, electric scooter 100, is present within the interior of vehicle 110, as described above.

In some embodiments, charging temperature control system 800 includes at least one type or form of scooter charging unit 310 that is configured to supply electric power from vehicle 110 to battery 312 of electric scooter 100. For example, in one embodiment, charging unit 310 may be in the form of power outlet 200, described above.

In this embodiment, charging temperature control system 800 further includes at least one supplemental heating and cooling system 802. Supplemental heating and cooling system 802 may be a secondary HVAC system associated with vehicle 110 that is configured to provide additional or supplemental heating or cooling to one or more specific areas of vehicle 110, such as one or more of the compartments where an electric personal transport device (e.g., electric scooter 100), may be charging. For example, as shown in FIG. 7, air outlet 700 located at rear compartment 112 of vehicle 110 may be part of supplemental heating and cooling system 802 and may introduce hot or cold air to rear compartment 112 to help regulate the temperature inside of vehicle 110 while electric scooter 100 is charging.

In accordance with the techniques of the present embodiments, HVAC controller 302 is configured to receive information from temperature sensor 306, presence sensor 308, and/or charging unit 310 and automatically regulate the temperature inside of vehicle 110 using supplemental heating and cooling system 802 and/or heating and cooling system 304 while electric scooter 100 is being charged to maintain an effective or optimal temperature range inside vehicle 110 for charging battery 312 of electric scooter 100. In some embodiments, temperature sensor 306, or at least one additional temperature sensor, may be located at or associated with a specific compartment within the interior of vehicle 110, for example, a compartment where electric scooter 100 is being charged, such as rear compartment 112, as shown in FIG. 7. In some cases, HVAC controller 302 may regulate temperatures inside of vehicle 110 using either of, or both of, supplemental heating and cooling system 802 and heating and coiling system 304.

Figure 9:
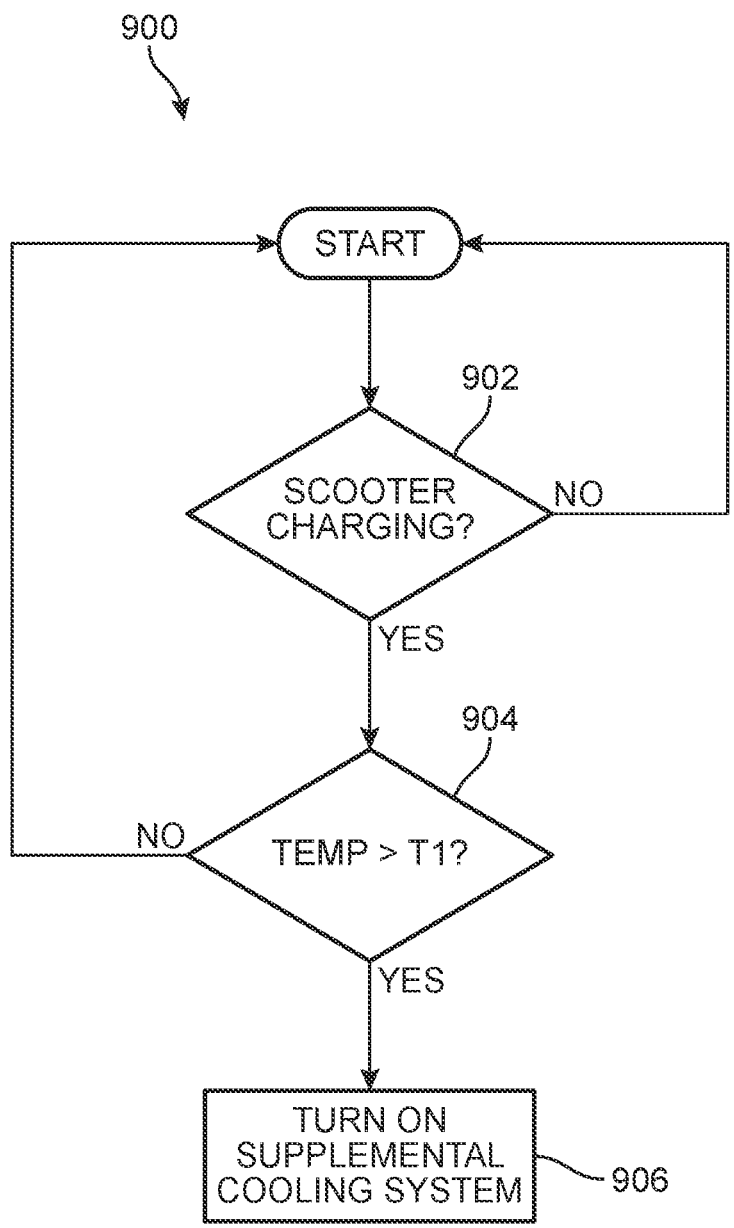
FIG. 9 is a flowchart of another embodiment of a method for controlling temperature inside a vehicle having a supplemental cooling system during charging of the electric scooter in accordance with aspects of the present disclosure.

Referring now to FIG. 9, an alternate embodiment of a method 900 for controlling temperature inside a vehicle during charging of an electric personal transport device using a supplemental or auxiliary cooling system is shown. In an example embodiment, method 900 may be implemented by at least one processor associated with charging temperature control system 800. For example, in some embodiments, a processor of HVAC controller 302 of charging temperature control system 800 may implement method 900. In this embodiment, method 900 is configured to allow charging temperature control system 800 to control a supplemental or auxiliary HVAC system of a vehicle, for example, supplemental heating and cooling system 802 of vehicle 110, described above, to reduce temperatures inside of vehicle 110, such as by operating the cooling system (e.g., a fan or an air conditioner) to direct cool or cold air towards a specific compartment in which electric scooter 100 is charging.

In one embodiment, method 900 may begin at an operation 902. At operation 902, whether or not an electric personal transport device, for example, electric scooter 100, is charging inside the vehicle is detected. For example, at operation 902, a signal from presence sensor 308 and/or a signal from charging unit 310 may be used to make the determination of whether or not electric scooter 100 is charging inside vehicle 110. In some cases, a signal from either presence sensor 308 or charging unit 310 may be used to affirmatively detect that electric scooter 100 is charging inside vehicle 110 (i.e., "Yes" result at operation 902). In other cases, a signal from both presence sensor 308 and charging unit 310 may be needed to affirmatively detect that electric scooter 100 is charging inside vehicle 110 (i.e., "Yes" result at operation 902).

Upon determining at operation 902 that electric scooter 100 is not charging inside vehicle 110 (i.e., "No" result at operation 902), then method 900 may proceed back to the start until such time that presence sensor 308 and/or charging unit 310 detect that electric scooter 100 is charging inside vehicle 110.

Upon determining at operation 902 that electric scooter 100 is charging inside vehicle 110 (i.e., "Yes" result at operation 902), then method 900 may proceed to an operation 904. At operation 904, an ambient temperature inside the vehicle is compared with a first threshold temperature (T1) to determine whether the ambient temperature is greater than the first threshold temperature (T1). In some cases, the ambient temperature measured or detected at operation 904 may be received from a temperature sensor located at or associated with a specific compartment of the vehicle where electric scooter 100 is charging. For example, the ambient temperature inside vehicle 110 and/or a specific compartment (e.g., rear compartment 112) may be provided to HVAC controller 302 of charging temperature control system 800 from temperature sensor 306 and/or at least one additional temperature sensor, described above.

In some embodiments, the first threshold temperature (T1) may be a predetermined temperature associated with degraded or inefficient charging of a battery. For example, in some embodiments, the first threshold temperature (T1) may be approximately 140 degrees Fahrenheit or 60 degrees Celsius. In another embodiment, the first threshold temperature (T1) may be approximately 100 degrees Fahrenheit or 40 degrees Celsius. In other embodiments, the first threshold temperature (T1) may be a higher temperature or a lower temperature.

Upon determining at operation 904 that the ambient temperature inside the vehicle is not greater than the first threshold temperature (T1) (i.e., "No" result at operation 904), then method 900 may proceed back to the start. Method 900 may be restarted after expiration of a predetermined time (e.g., 30 minutes, one hour, etc.), until such time that presence sensor 308 and/or charging unit 310 newly detect that electric scooter 100 is charging inside vehicle 110, or until an ambient temperature in excess of the first threshold temperature (T1) is measured or detected by temperature sensor 306 and/or the least one additional temperature sensor.

Upon determining at operation 904 that the ambient temperature inside the vehicle is greater than the first threshold temperature (T1) (i.e., "Yes" result at operation 904), then method 900 may proceed to an operation 906. At operation 906, a supplemental cooling system of the vehicle is operated to turn on to reduce the temperature inside of the vehicle or the specific compartment. For example, at operation 906, HVAC controller 302 of charging temperature control system 800 may operate the supplemental cooling system (e.g., a fan or air conditioner) of supplemental heating and cooling system 802 of vehicle 110 to reduce the ambient temperature inside of vehicle 110 while electric scooter 100 is charging. In one embodiment, supplemental heating and cooling system 802 may direct cool or cold air through air outlet 700 located at rear compartment 112 of vehicle 110 to directly reduce the ambient temperature in the compartment where electric scooter 100 is being charged (as shown in FIG. 7).

In some cases, the cooling system may remain on while electric scooter 100 is charging. In other cases, the cooling system may be turned off when the ambient temperature measured or detected by temperature sensor 306 and/or at least one additional temperature sensor is less than the first threshold temperature (T1). In still other cases, the cooling system may be controlled to remain on for a predetermined amount of time, or to maintain the ambient temperature at a consistent temperature below the first threshold temperature (T1).

Figure 10:
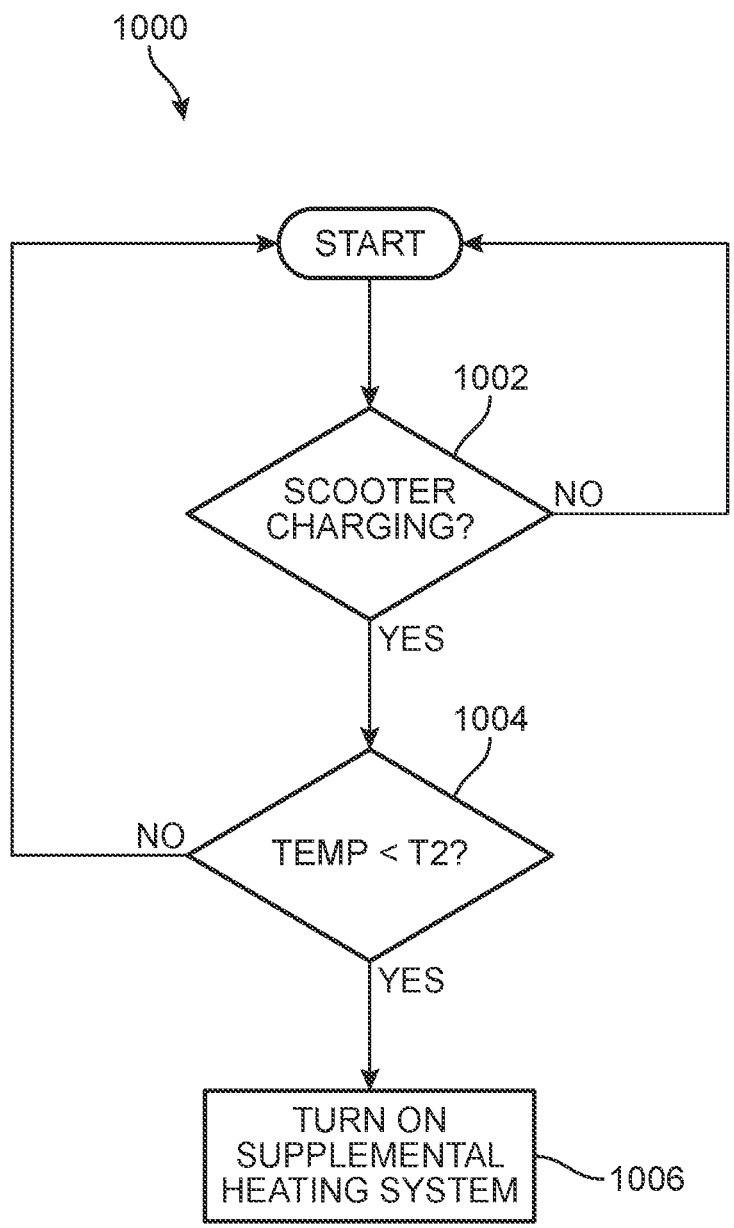
FIG. 10 is a flowchart of another embodiment of a method for controlling temperature inside a vehicle having a supplemental heating system during charging of the electric scooter in accordance with aspects of the present disclosure.

Referring now to FIG. 10, an alternate embodiment of a method 1000 for controlling temperature inside a vehicle during charging of an electric personal transport device using a supplemental or auxiliary heating system is shown. In an example embodiment, method 1000 may be implemented by at least one processor associated with charging temperature control system 800. For example, in some embodiments, a processor of HVAC controller 302 of charging temperature control system 800 may implement method 1000. In this embodiment, method 1000 is configured to allow charging temperature control system 800 to control a supplemental or auxiliary HVAC system of a vehicle, for example, supplemental heating and cooling system 802 of vehicle 110, described above, to increase temperatures inside of vehicle 110, such as by operating the supplemental heating system to direct warm or hot air towards a specific compartment in which electric scooter 100 is charging.

In one embodiment, method 1000 may begin at an operation 1002. At operation 1002, whether or not an electric personal transport device, for example, electric scooter 100, is charging inside the vehicle is detected. For example, at operation 1002, a signal from presence sensor 308 and/or a signal from charging unit 310 may be used to make the determination of whether or not electric scooter 100 is charging inside vehicle 110. In some cases, a signal from either presence sensor 308 or charging unit 310 may be used to affirmatively detect that electric scooter 100 is charging inside vehicle 110 (i.e., "Yes" result at operation 1002). In other cases, a signal from both presence sensor 308 and charging unit 310 may be needed to affirmatively detect that electric scooter 100 is charging inside vehicle 110 (i.e., "Yes" result at operation 1002).

Upon determining at operation 1002 that electric scooter 100 is not charging inside vehicle 110 (i.e., "No" result at operation 1002), then method 1000 may proceed back to the start until such time that presence sensor 308 and/or charging unit 310 detect that electric scooter 100 is charging inside vehicle 110.

Upon determining at operation 1002 that electric scooter 100 is charging inside vehicle 110 (i.e., "Yes" result at operation 1002), then method 1000 may proceed to an operation 1004. At operation 1004, an ambient temperature inside the vehicle is compared with a second threshold temperature (T2) to determine whether the ambient temperature is less than the second threshold temperature (T2). In some cases, the ambient temperature measured or detected at operation 1004 may be received from a temperature sensor located at or associated with a specific compartment of the vehicle where electric scooter 100 is charging. For example, the ambient temperature inside vehicle 110 and/or a specific compartment (e.g., rear compartment 112) may be provided to HVAC controller 302 of charging temperature control system 800 from temperature sensor 306 and/or at least one additional temperature sensor, described above.

In some embodiments, the second threshold temperature (T2) may be a predetermined temperature associated with degraded or inefficient charging of a battery. For example, in some embodiments, the second threshold temperature (T2) may be approximately 14 degrees Fahrenheit or −10 degrees Celsius. In another embodiment, the second threshold temperature (T2) may be approximately 32 degrees Fahrenheit or degrees Celsius. In other embodiments, the second threshold temperature (T2) may be a higher temperature or a lower temperature.

Upon determining at operation 1004 that the ambient temperature inside the vehicle is not less than the second threshold temperature (T2) (i.e., "No" result at operation 1004), then method 1000 may proceed back to the start. Method 1000 may be restarted after expiration of a predetermined time (e.g., 30 minutes, one hour, etc.), until such time that presence sensor 308 and/or charging unit 310 newly detect that electric scooter 100 is charging inside vehicle 110, or until an ambient temperature below the second threshold temperature (T2) is measured or detected by temperature sensor 306 and/or the at least one additional temperature sensor associated with a specific compartment.

Upon determining at operation 1004 that the ambient temperature inside the vehicle is less than the second threshold temperature (T2) (i.e., "Yes" result at operation 1004), then method 1000 may proceed to an operation 1006. At operation 1006, a supplemental or auxiliary heating system of the vehicle is operated to turn on to increase the temperature inside of the vehicle or the specific compartment. For example, at operation 1006, HVAC controller 302 of charging temperature control system 800 may operate the supplemental heating system of supplemental heating and cooling system 802 of vehicle 110 to increase the ambient temperature inside of vehicle 110 while electric scooter 100 is charging. In some embodiments, HVAC controller 302 may additionally operate the heating system of heating and cooling system 304 to provide additional heating capacity to the interior of vehicle 110. In some cases, the supplemental heating system may remain on while electric scooter 100 is charging. In other cases, the supplemental heating system may be turned off when the ambient temperature measured or detected by temperature sensor 306 is greater than the second threshold temperature (T2). In still other cases, the supplemental heating system may be controlled to remain on for a predetermined amount of time, or to maintain the ambient temperature at a consistent temperature above the second threshold temperature (T2).

Figure 11:
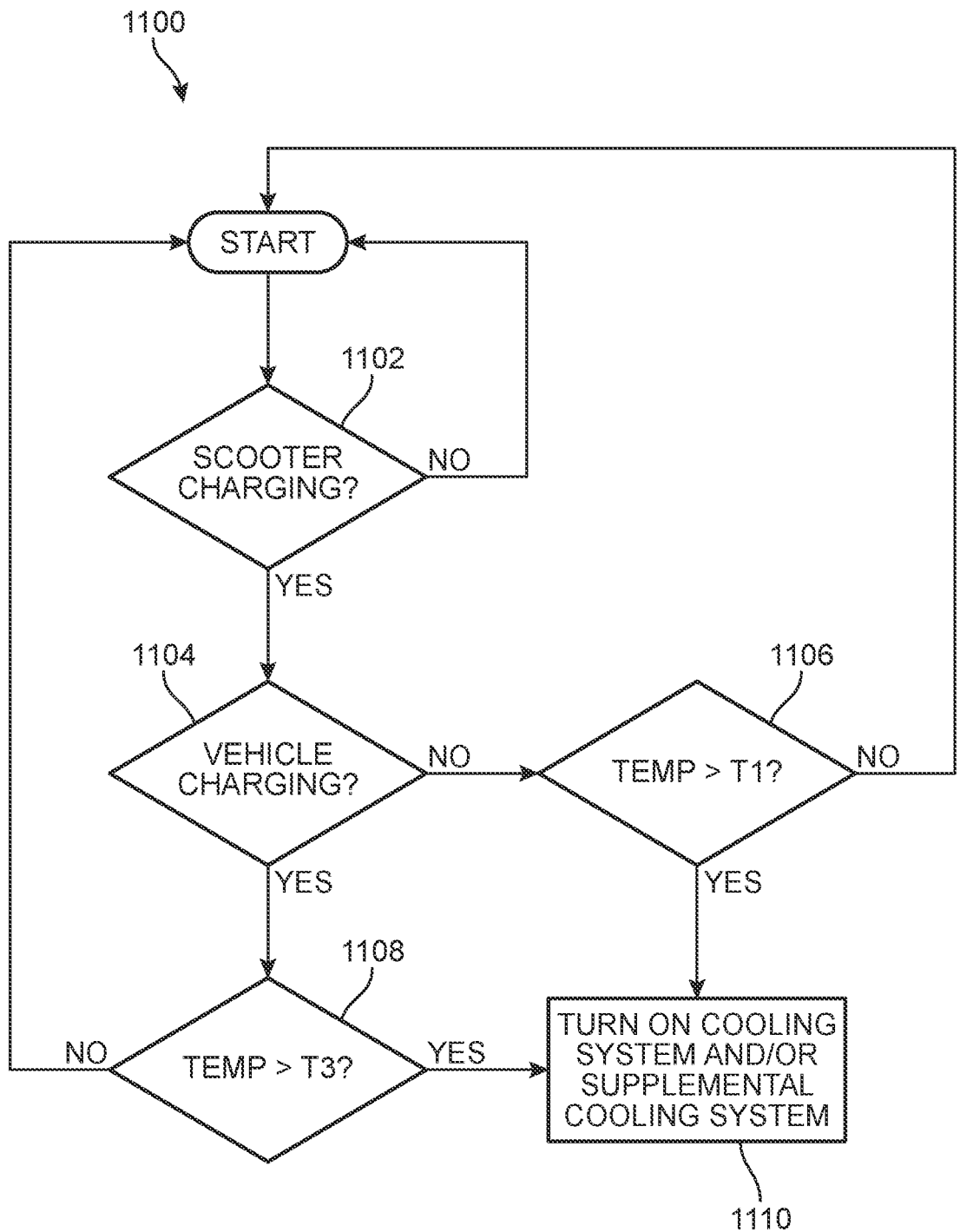
FIG. 11 is a flowchart of another embodiment of a method for controlling temperature inside a vehicle during charging of the electric scooter based on whether the vehicle is being charged in accordance with aspects of the present disclosure.

In some embodiments, for example, where the vehicle (e.g., vehicle 110) is an electric vehicle that includes an electric motor and a battery, such as a BEV or PEV, the techniques of the present embodiments may be used to regulate temperatures inside the vehicle using different temperature thresholds based on whether or not the vehicle itself is also charging while the electric personal transport device (e.g., electric scooter 100) is charging inside the vehicle. Referring now to FIG. 11, another embodiment of a method 1100 for controlling temperature inside an electric vehicle during charging of the electric scooter based on whether the vehicle is being charged is shown.

In an example embodiment, method 1100 may be implemented by an HVAC controller of a charging temperature control system in a vehicle having a single HVAC system (e.g., as shown in FIG. 3) or in a vehicle having a primary or main HVAC system and at least one supplemental or auxiliary HVAC system (e.g., as shown in FIG. 8). Additionally, while method 1100 is described herein for regulating or controlling temperatures inside a vehicle by using at least one cooling system to reduce the temperatures inside the vehicle, similar techniques may also be used to regulate or control temperatures inside a vehicle by using at least one heating system to increase the temperatures inside the vehicle.

In this embodiment, method 1100 is configured to allow charging temperature control system 300 or charging temperature control system 800 to control an HVAC system of a vehicle, for example, heating and cooling system 304 and/or supplemental heating and cooling system 802 of vehicle 110, described above, to reduce temperatures inside of vehicle 110, such as by operating one or both of the cooling systems (e.g., a fan or an air conditioner) using temperature thresholds that vary based on whether or not vehicle 110 is charging.

In one embodiment, method 1100 may begin at an operation 1102. At operation 1102, whether or not an electric personal transport device, for example, electric scooter 100, is charging inside the vehicle is detected. For example, at operation 1102, a signal from presence sensor 308 and/or a signal from charging unit 310 may be used to make the determination of whether or not electric scooter 100 is charging inside vehicle 110. In some cases, a signal from either presence sensor 308 or charging unit 310 may be used to affirmatively detect that electric scooter 100 is charging inside vehicle 110 (i.e., "Yes" result at operation 1102). In other cases, a signal from both presence sensor 308 and charging unit 310 may be needed to affirmatively detect that electric scooter 100 is charging inside vehicle 110 (i.e., "Yes" result at operation 1102).

Upon determining at operation 1102 that electric scooter 100 is not charging inside vehicle 110 (i.e., "No" result at operation 1102), then method 1100 may proceed back to the start until such time that presence sensor 308 and/or charging unit 310 detect that electric scooter 100 is charging inside vehicle 110. Upon determining at operation 1102 that electric scooter 100 is charging inside vehicle 110 (i.e., "Yes" result at operation 1102), then method 1100 may proceed to an operation 1104.

At operation 1104, whether or not the vehicle itself is currently charging is determined. For example, in some embodiments, vehicle 110 may include an electric motor and battery that provides power to the electric motor. When the battery of vehicle 110 is being charged, a signal may be provided to the HVAC controller (e.g., HVAC controller 302) from the vehicle's electrical system to inform the HVAC controller that vehicle 110 is currently connected to a charger and is being charged.

Upon determining at operation 1104 that the vehicle is not being charged (i.e., "No" result at operation 1104), then method 1100 may proceed to an operation 1106. At operation 1106, an ambient temperature inside the vehicle is compared with a first threshold temperature (T1) to determine whether the ambient temperature is greater than the first threshold temperature (T1). For example, the ambient temperature inside vehicle 110 may be provided to HVAC controller 302 of charging temperature control system 300 from temperature sensor 306, described above. In some embodiments, the first threshold temperature (T1) may be a predetermined temperature associated with degraded or inefficient charging of a battery. For example, in some embodiments, the first threshold temperature (T1) may be approximately 140 degrees Fahrenheit or 60 degrees Celsius.

Upon determining at operation 1106 that the ambient temperature inside the vehicle is not greater than the first threshold temperature (T1) (i.e., "No" result at operation 1106), then method 1100 may proceed back to the start. Method 1100 may be restarted after expiration of a predetermined time (e.g., 30 minutes, one hour, etc.), until such time that presence sensor 308 and/or charging unit 310 newly detect that electric scooter 100 is charging inside vehicle 110, or until an ambient temperature in excess of the first threshold temperature (T1) is measured or detected by temperature sensor 306.

Upon determining at operation 1106 that the ambient temperature inside the vehicle is greater than the first threshold temperature (T1) (i.e., "Yes" result at operation 1106), then method 1100 may proceed to an operation 1110. At operation 1110, a cooling system and/or a supplemental cooling system of the vehicle is operated to turn on to reduce the temperature inside of the vehicle or a specific compartment. For example, at operation 1110, HVAC controller 302 of charging temperature control system 300, 800 may operate the cooling system (e.g., a fan or air conditioner) of heating and cooling system 304 and/or the supplemental cooling system of supplemental heating and cooling system 802 of vehicle 110 to reduce the ambient temperature inside of vehicle 110 and/or a specific compartment while electric scooter 100 is charging.

Returning to operation 1104, upon determining at operation 1104 that the vehicle itself is being charged while the electric personal transport device is also being charged (i.e., "Yes" result at operation 1104), then method 1100 may proceed to an operation 1108. At operation 1108, an ambient temperature inside the vehicle is compared with a third threshold temperature (T3) to determine whether the ambient temperature is greater than the third threshold temperature (T3). For example, the ambient temperature inside vehicle 110 may be provided to HVAC controller 302 of charging temperature control system 300 from temperature sensor 306, described above.

In this embodiment, the third threshold temperature (T3) is a lower temperature than the first threshold temperature (T1). In some embodiments, the third threshold temperature (T3) may be a predetermined temperature associated with optimal or ideal charging of a battery. For example, in some embodiments, the third threshold temperature (T3) may be approximately 100 degrees Fahrenheit or 40 degrees Celsius. With this arrangement, when the electric vehicle is being charged while the electric personal transport device is also being charged, the heating and cooling systems of the vehicle may be controlled to regulate the temperatures inside the vehicle to be lower than when the vehicle is not being charged. That is, because the electric vehicle is connected to a power source for charging, the heating and cooling systems of the vehicle may be operated to reduce temperatures inside the vehicle to a lower temperature for optimum or ideal charging of the battery of the electric personal transport device, without concerns of draining the vehicle's own battery.

Upon determining at operation 1108 that the ambient temperature inside the vehicle is not greater than the third threshold temperature (T3) (i.e., "No" result at operation 1108), then method 1100 may proceed back to the start. Method 1100 may be restarted after expiration of a predetermined time (e.g., 30 minutes, one hour, etc.), until such time that presence sensor 308 and/or charging unit 310 newly detect that electric scooter 100 is charging inside vehicle 110, or until an ambient temperature in excess of the third threshold temperature (T3) is measured or detected by temperature sensor 306.

Upon determining at operation 1108 that the ambient temperature inside the vehicle is greater than the third threshold temperature (T3) (i.e., "Yes" result at operation 1108), then method 1100 may proceed to operation 1110 where a cooling system and/or a supplemental cooling system of the vehicle is operated to turn on to reduce the temperature inside of the vehicle or a specific compartment. For example, at operation 1110, HVAC controller 302 of charging temperature control system 300, 800 may operate the cooling system (e.g., a fan or air conditioner) of heating and cooling system 304 and/or the supplemental cooling system of supplemental heating and cooling system 802 of vehicle 110 to reduce the ambient temperature inside of vehicle 110 and/or a specific compartment while electric scooter 100 is charging to at least the third threshold temperature (T3).

In some cases, the cooling system(s) may remain on while electric scooter 100 is charging. In other cases, the cooling system(s) may be turned off when the ambient temperature measured or detected by temperature sensor 306 is less than the first threshold temperature (T1) or the third threshold temperature (T3) when the vehicle is charging. In still other cases, the cooling system(s) may be controlled to remain on for a predetermined amount of time, or to maintain the ambient temperature at a consistent temperature below the first threshold temperature (T1) or the third threshold temperature (T3) when the vehicle is charging.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A method of regulating temperatures inside of a vehicle while an electric personal transport device is charging inside the vehicle by a heating, ventilation and air conditioning (HVAC) controller including at least one processor, the method comprising:

receiving a signal from both of an electric personal transport device presence sensor and a charging unit for the electric personal transport device, the signal indicating that the electric personal transport device is charging inside the vehicle;

receiving an ambient temperature inside the vehicle from at least one temperature sensor, the at least one temperature sensor including a temperature sensor located at a rear compartment of the vehicle where the electric personal transport device is charging;

wherein the electric personal transport device has a rectangular shape with flat side surfaces, wherein the electric personal transport device is configured to lay flat on a floor surface at the rear compartment of the vehicle by a tray provided in the floor surface, and wherein the tray is sized and dimensioned to hold the electric personal transport device in place and restrain movement while the vehicle is in motion;

comparing the ambient temperature inside the vehicle to a first threshold temperature;

comparing the ambient temperature inside the vehicle to a second threshold temperature;

based on the comparison of the ambient temperature inside the vehicle to the first threshold temperature and the second threshold temperature, operating at least one heating and cooling system of the vehicle to regulate the temperature inside the vehicle within a temperature range between the first threshold temperature and the second threshold temperature;

wherein the vehicle includes a supplemental heating and cooling system and wherein at least one air outlet of the supplemental heating and cooling system is located in the rear compartment; and wherein the method further comprises operating the supplemental heating and cooling system to reduce or increase the ambient temperature while the electric personal transport device is charging inside the vehicle in the rear compartment.

2. The method according to claim 1, wherein the method further comprises operating a cooling system of the at least one heating and cooling system to reduce the ambient temperature inside the vehicle below the first threshold temperature.

3. The method according to claim 2, wherein the method further comprises operating a heating system of the at least one heating and cooling system to increase the ambient temperature inside the vehicle above the second threshold temperature.

4. The method according to claim 1, wherein the ambient temperature inside the vehicle is compared to the first threshold temperature only when the vehicle is not charging; and wherein the ambient temperature inside the vehicle is compared to a third threshold temperature when the vehicle is charging, the third threshold temperature being lower than the first threshold temperature such that the ambient temperature inside the vehicle is made cooler when the vehicle is charging than when the vehicle is not charging.

5. The method according to claim 1, wherein the method further comprises operating a cooling system of the supplemental heating and cooling system to reduce the ambient temperature inside the rear compartment of the vehicle below the first threshold temperature.

6. The method according to claim 5, wherein the method further comprises operating a heating system of the supplemental heating and cooling system to increase the ambient temperature inside the rear compartment of the vehicle above the second threshold temperature.

7. A charging temperature control system for a vehicle, comprising:
a heating, ventilation and air conditioning (HVAC) controller including at least one processor;
at least one heating and cooling system configured to be controlled by the HVAC controller;
at least one temperature sensor for measuring an ambient temperature inside the vehicle;
an electric personal transport device presence sensor; and
a charging unit for the electric personal transport device;
wherein the electric personal transport device has a rectangular shape with flat side surfaces, wherein the electric personal transport device is configured to lay flat on a floor surface at a rear compartment of the vehicle by a tray provided in the floor surface, and wherein the tray is sized and dimensioned to hold the electric personal transport device in place and restrain movement while the vehicle is in motion;
wherein the at least one processor of the HVAC controller is configured to:
receive a signal from both of the electric personal transport device presence sensor and the charging unit, the signal indicating that the electric personal transport device is charging inside the vehicle;
receive an ambient temperature inside the vehicle from the at least one temperature sensor, the at least one temperature sensor including a temperature sensor located at the rear compartment of the vehicle where the electric personal transport device is charging;
compare the ambient temperature inside the vehicle to a first threshold temperature;
compare the ambient temperature inside the vehicle to a second threshold temperature;
based on the comparison of the ambient temperature inside the vehicle to the first threshold temperature and the second threshold temperature, operate the at least one heating and cooling system to regulate the temperature inside the vehicle within a temperature range between the first threshold temperature and the second threshold temperature;
wherein the vehicle includes a supplemental heating and cooling system and wherein at least one air outlet of the supplemental heating and cooling system is located in the rear compartment; and
wherein the at least one processor of the HVAC controller is further configured to operate the supplemental heating and cooling system to reduce or increase the ambient temperature while the electric personal transport device is charging inside the vehicle in the rear compartment.

8. The system according to claim 7, wherein the at least one processor of the HVAC controller is configured to operate a cooling system of the at least one heating and cooling system to reduce the ambient temperature inside the vehicle below the first threshold temperature.

9. The system according to claim 8, wherein the at least one processor of the HVAC controller is configured to operate a heating system of the at least one heating and cooling system to increase the ambient temperature inside the vehicle above the second threshold temperature.

10. The system according to claim 7, wherein the ambient temperature inside the vehicle is compared to the first threshold temperature only when the vehicle is not charging; and
wherein the ambient temperature inside the vehicle is compared to a third threshold temperature when the vehicle is charging, the third threshold temperature being lower than the first threshold temperature such that the ambient temperature inside the vehicle is made cooler when the vehicle is charging than when the vehicle is not charging.

11. The system according to claim 7, wherein the at least one processor of the HVAC controller is configured to operate a cooling system of the supplemental heating and cooling system to reduce the ambient temperature inside the rear compartment of the vehicle below the first threshold temperature.

12. The system according to claim 11, wherein the at least one processor of the HVAC controller is configured to operate a heating system of the supplemental heating and cooling system to increase the ambient temperature inside the rear compartment of the vehicle above the second threshold temperature.

13. The system according to claim 7, wherein the at least one processor of the HVAC controller is configured to operate both a primary heating and cooling system and the supplemental heating and cooling system to regulate the ambient temperature inside the vehicle.

14. The system according to claim 7, wherein the vehicle includes at least an electric motor and a battery configured to provide power to the electric motor;
wherein the at least one processor of the HVAC controller is configured to:
detect when the battery of the vehicle is being charged;

upon determining that the battery of the vehicle is not being charged while the electric personal transport device is charging inside the vehicle, operate a cooling system of the at least one heating and cooling system to reduce the ambient temperature inside the vehicle below the first threshold temperature;

upon determining that the battery of the vehicle is being charged while the electric personal transport device is charging inside the vehicle, operate the cooling system of the at least one heating and cooling system to reduce the ambient temperature inside the vehicle below a third threshold temperature, wherein the third threshold temperature is less than the first threshold temperature such that the ambient temperature inside the vehicle is made cooler when the vehicle is being charged than when the vehicle is not being charged.

15. A method of regulating temperatures inside of an electric vehicle while an electric personal transport device is charging inside the electric vehicle by a heating, ventilation and air conditioning (HVAC) controller including at least one processor, the method comprising:

detecting whether a battery of the electric vehicle is currently being charged;

receiving a signal from both of an electric personal transport device presence sensor and a charging unit for the electric personal transport device, the signal indicating that the electric personal transport device is charging inside the electric vehicle;

receiving an ambient temperature inside the vehicle from at least one temperature sensor, the at least one temperature sensor including a temperature sensor located at a rear compartment of the vehicle where the electric personal transport device is charging;

comparing the ambient temperature inside the electric vehicle to a threshold temperature;

based on the comparison of the ambient temperature inside the electric vehicle to the threshold temperature, operating at least one heating and cooling system of the vehicle to regulate the temperature inside the electric vehicle within a temperature range;

wherein the threshold temperature varies based on whether the battery of the electric vehicle is being charged or not such that the ambient temperature inside the vehicle is made cooler when the vehicle is being charged than when the vehicle is not being charged;

wherein the electric personal transport device has a rectangular shape with flat side surfaces, wherein the electric personal transport device is configured to lay flat on a floor surface at the rear compartment of the vehicle by a tray provided in the floor surface, and wherein the tray is sized and dimensioned to hold the electric personal transport device in place and restrain movement while the vehicle is in motion;

wherein the vehicle includes a supplemental heating and cooling system and wherein at least one air outlet of the supplemental heating and cooling system is located in the rear compartment; and wherein the method further comprises operating the supplemental heating and cooling system to reduce or increase the ambient temperature while the electric personal transport device is charging inside the vehicle in the rear compartment.

16. The method according to claim 15, wherein, upon determining that the battery of the electric vehicle is not being charged, the threshold temperature is a first threshold temperature; and wherein the method further comprises operating a cooling system of the at least one heating and cooling system to reduce the ambient temperature inside the electric vehicle below the first threshold temperature.

17. The method according to claim 16, wherein, upon determining that the battery of the electric vehicle is currently being charged, the threshold temperature is a third threshold temperature, the third threshold temperature being less than the first threshold temperature; and wherein the method further comprises operating the cooling system of the at least one heating and cooling system to reduce the ambient temperature inside the electric vehicle below the third threshold temperature.

18. The method according to claim 15, further comprising operating both a primary heating and cooling system and the supplemental heating and cooling system to regulate the ambient temperature inside the electric vehicle.

* * * * *